United States Patent Office 3,834,924
Patented Sept. 10, 1974

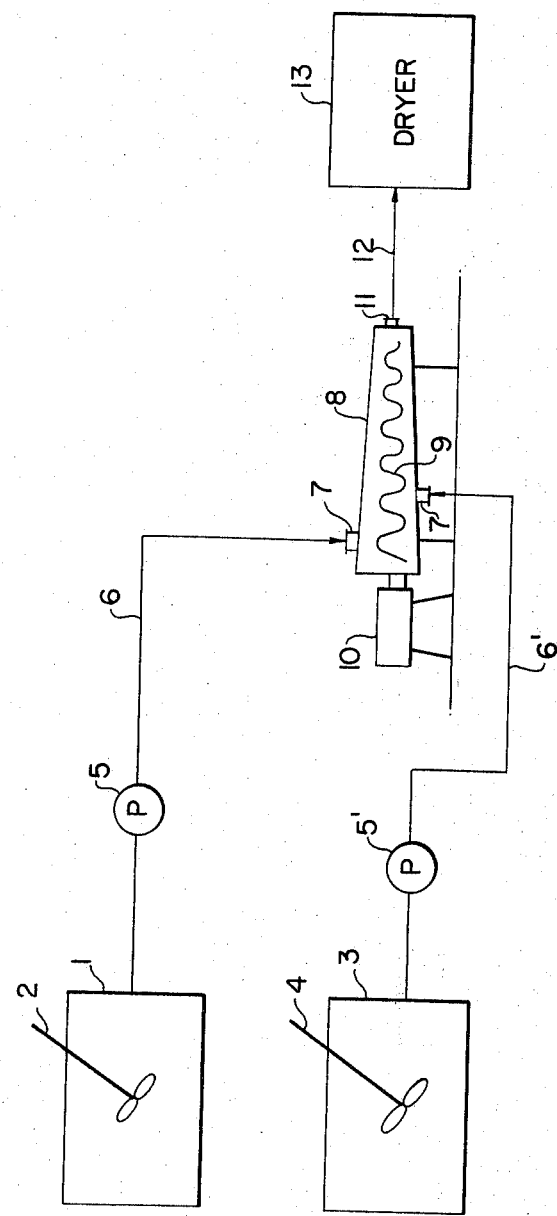

3,834,924
PROCESS FOR MANUFACTURING SURFACE
MODIFIED INORGANIC PIGMENTS
Thomas A. Grillo, Macon, Ga., assignor to
J. M. Huber Corporation, Locust, N.J.
Filed June 8, 1972, Ser. No. 263,729
Int. Cl. C08h 17/04; C09c 1/28
U.S. Cl. 106—308 N                    7 Claims

ABSTRACT OF THE DISCLOSURE

An improved process for producing surface modified, finely divided inorganic pigments, is disclosed. The process includes the addition of an organosilane to a high solids content aqueous dispersion of an inorganic pigment in a mixing zone or apparatus, such as a screw pump or extruder, to yield a thick, flowable plastic-type mass suitable for extrusion and drying. Inorganic pigments that may be advantageously surface modified include hydrated or anhydrous silicas, metal silicates, sodium alumino silicates, finely divided particulate clays, and the like. The organosilanes comprise amino organosilanes such as aminopropyltriethoxysilane, etc. The process of the invention eliminates the need for filtration, common to prior known techniques, the loss of silanes in the filtrate and otherwise streamlines the production operation.

BACKGROUND OF THE INVENTION

The present invention relates to inorganic pigments and, more particularly, to an improved manufacturing technique for producing finely divided surface modified inorganic pigments.

As known in the art, inorganic pigments, such as hydrated or anhydrous silicas, metal silicates, sodium alumino silicates, hydrated aluminum silicates, e.g., clays, have found ever increasing uses in many industries. For example, such pigments are employed in paper coating compositions, as fillers for paper, paints, inks, etc., and as reinforcing pigments or fillers in elastomers and other polymeric materials. Because of their commercial importance prior artisans have, for many years, expended much time and effort in order to improve the properties of the pigments, not only to enhance their characteristics or properties for a given use but also to expand the utility of the pigments to new areas.

In this regard, a specific example of inorganic pigments developed as a result of the aforementioned research activities comprise those finely divided surface modified products sold under the trademark "Nulok" by the J. M. Huber Corporation. In general "Nulok" products comprise finely divided inorganic pigments which have been surface modified with saturated amino organosilanes. Such pigments have been found to be particularly advantageous for use in paper coating compositions, as fillers for paper, paints, varnishes, inks, etc., and, because of their affinity for dyes, are useful as color-imparting fillers. In addition, "Nulok" pigments have been found to have particular utility for use as fillers for thermosetting resins such as polyurethanes, epoxy polymers, etc. as well as other polymers and elastomers including polyethylene, polypropylene, polystyrene, and the like. Such products, as well as further uses thereof, are disclosed in detail in U.S. Pat. 3,290,165 which was issued Dec. 6, 1966. In this patent there is also disclosed a method for preparing the surface modified pigments, which method involves dissolving the desired amount of the amino organosilane in a suitable solvent, adding the pigment as a form of dilute aqueous dispersion thereof, heating the mixture until the reaction is complete and thereafter filtering and drying the product. While this process is straight forward and produces the desired pigment, it has been found to suffer from the disadvantage of requiring the use of low solids content dispersions or slurries of the inorganic pigment and somewhat elaborate filtration techniques. The present invention is directed to an improved manufacturing process that overcomes the aforementioned disadvantages.

SUMMARY OF THE INVENTION

In summary, the present invention provides a highly efficient, economical and simplified process for producing finely divided surface modified inorganic pigments. The invention is based on the recognition that the addition of an amino organosilane to a high solids content aqueous dispersion of an inorganic pigment in a mixing vessel, such as a kneading or extrusion type apparatus, yields a thick, flowable, plastic-like product that is suitable for extrusion and drying. The process of the invention eliminates the need for filtration, eliminates the loss of silanes in the filtrate, allows the use of high solids content dispersion or slurries and otherwise streamlines the production operation.

Broadly speaking, in accordance with the process of the invention, an aqueous high solids content low viscosity dispersion of a pigment and a solution of the organosilane are introduced into a mixing zone to form the said thick, flowable, plastic-like mass as a result of a reaction between the reactive surface groups of the pigment with the functional groups of the organosilane. Thereafter the product is withdrawn or extruded from the mixing zone in the aforementioned form which may be fed directly into a conventional drying apparatus.

It is accordingly a general object of this invention to provide a new and improved process for producing surface modified, finely divided inorganic pigments.

Another and more particular object is to provide a process for producing surface modified inorganic pigments wherein a high solids content low viscosity aqueous dispersion of finely divided inorganic pigments and a solution of an amino organosilane are introduced into a pressurized mixing zone to thereby form a thick flowable, plastic-type mass suitable for extrusion and drying.

Yet another object is to provide a novel process for producing surface modified inorganic pigments in a manner which eliminates the need for filtration, allows the use of high solids content low viscosity pigment slurries, and otherwise streamlines the production operation.

Still a further object is to provide an economical method for producing a surface modified finely divided inorganic pigment in the form of a cake-like paste suitable for extrusion and drying.

BRIEF DESCRIPTION OF THE DRAWINGS

The manner in which the foregoing and other objects are achieved in accordance with the present invention will be better understood in view of the following detailed description and the accompanying drawing, which form a part of the specification, and wherein:

FIG. 1 is a diagrammatic illustration, shown in elevation, of a suitable arrangement of apparatus for carrying out a particularly advantageous method embodiment of the invention.

DESCRIPTION OF PREFERRED EMBODIMENTS

As generally discussed above, surface modified inorganic pigments are produced in accordance with the instant invention by adding an amino organosilane to a high solids content pigment dispersion or slurry to change the slurry form into a thick, flocculated and plastic-type mass that is suitable for extrusion and drying. Because a thick cake-like product is formed, the organosilane and pigment dispersion are preferably mixed or blended directly in a suitable solids mixing apparatus, such as conventional screw type pumps, kneaders, pugmills and extruders, which are designed or may be adapted to extrude the plastic mass in the form of a compacted rod type body. Such apparatus are well known, being disclosed, for example, in U.S. Pats. 3,357,049 and 3,380,116, as well as in standard engineering texts or handbooks. A detailed description of mixers for plastic masses is disclosed e.g., in McCabe and Smith "Unit Operations of Chemical Engineering," pages 300–312, McGraw-Hill Book Company, Inc., 1956 and Perry, J. H. "Chemical Engineer's Handbook," 3rd Ed., (a) pages 1202–1214, (b) pages 1228–1229, McGraw-Hill Book Company, Inc., New York 1950.

In the practice of the invention and with reference to FIG. 1, in accordance with one embodiment of the invention, a high solids content aqueous pigment slurry is prepared in a suitable tank or vessel, indicated generally at 1, which may be provided with conventional mixing or agitating means 2. As used herein, the term "high solids content" pigment slurry is intended to include aqueous slurries which have a solids content on the order of from about 40 to 80%, preferably 50 to 70%, by weight total solids, in the case of kaolin clays. The solids content termed "high solids content" for other materials may vary widely from the above specified range for clay but for each material will be in a well known range for those skilled in the art. For example, typical "high solids content" slurries for various materials would be on the order of the following: talc, 30%; titanium dioxide, 60%; diatomaceous earth, 30%; hydrated alumina, 60%; precipitated hydrated silica of very fine particle size, 30%; silica pigment, 25%; hydrated silicon dioxide, 20%. In some cases even materials falling within the generic terms above may have a rheology such that a 10 or 12% solids slurry would be considered to be one of "high solids content."

A solution of the organosilane is prepared in a separate vessel 3 which may also be equipped with an agitator 4. It has been found that particularly advantageous results are obtained if the solution of the organosilane is fairly dilute, i.e., less than 25% by weight of the silane. However, this is not critical and more concentrated solutions may be used. Suitable solvents for the amino organosilanes include organic solvents, such as benzene, toluene, methanol, etc., and water.

The aqueous dispersion of the inorganic pigment and the solution of the silane are next introduced, preferably under pressure as developed by pumps 5 and 5' through conduits 6 and 6' into the feed inlets 7 and 7' of a solids mixing extruding apparatus 8. As discussed above, the extruder 8 may be of conventional design and generally includes one or more screws 9 driven by a motor 10. The screw 9 is adapted to thoroughly mix or blend the feed materials and to advance same toward the discharge end of the apparatus and to force the mass through a restrictive orifice or die 11.

In the embodiment illustrated in the drawing, the pigment slurry and solution of the silane are introduced in tandem into the extruder 8 with the silane being added after the slurry. In this regard, the organosilane may be added in an amount such that it comprises from about 0.1% to 5% by weight, based on the weight of the pigment. In the extruder 9, a thick, plastic-type mass is formed which, as previously discussed, is forced through the orifice 11 resulting in a form which may be fed directly into a conventional dryer.

From the above, it will be seen that the present invention provides an economical and simplified process which eliminates the need for filtration, allows the use of high solids content pigment slurries and otherwise streamlines the production operation, such as making same particularly suitable for continuous operation.

As defined herein, and as disclosed in detail in the aforementioned U.S. Pat. 3,290,165, the term "amino or- ganosilane" is intended to include those compounds or products of the formula:

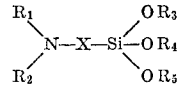

wherein $R_1$ is hydrogen, alkyl, aryl, cycloalkyl, alkylaryl, alkenyl, cycloalkenyl, alkene, alkylene, arylene, alkylarylene, arylalkylene, or cycloalkylene; $R_2$ is hydrogen, alkyl, aryl, cycloalkyl, alkylaryl, alkenyl, cycloalkenyl, alkene, alkylene, arylene, alkylarylene, arylalkylene, or cycloalkylene; $R_3$ is hydrogen, lower alkyl, aryl, lower alkylaryl, lower arylalkyl, alkenyl, cycloalkenyl, alkene, alkylene, arylene, alkylarylene, arylalkylene, or cycloalkylene; $R_4$ is hydrogen, lower alkyl, aryl, lower alkylaryl, lower arylalkyl, alkenyl, cycloalkenyl, alkene, alkylene, arylene, alkylarylene, arylalkylene, or cycoalkylene; $R_5$ is hydrogen, lower alkyl, aryl, lower alkylaryl, lower arylalkyl, alkenyl, cycloalkenyl, alkene, alkylene, arylene, alkylarylene, arylalkylene, or cycloalkylene; and X is alkyl, aryl, alkylaryl, arylalkyl, cycloalkyl, alkenyl, cycloalkenyl, alkene, alkenylene, cycloalkenylene, alkylene, arylene, alkylarylene, arylalkylene, cycloalkylene, with or without secondary and/or tertiary nitrogen pendant from the chain or other functional groups. Such amino organosilanes are known and are disclosed, along with methods for their preparation, in U.S. Pats. 2,832,754; 2,930,809; 3,077,957; and 3,020,302. Commercially available amino organosilanes include, for example, "A–1100" (gamma-aminopropyltriethoxysilane,

"Y–2967" (an amino silane which is a modified gamma-aminopropyltriethoxysilane) and "Y–5162" (a triamino silane having a structure

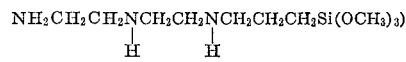

sold by Union Carbide Corporation, New York, N.Y.; "Z–6020" (a diamino functional silane) sold by Dow Corning Corporation, Midland, Mich.; and N-beta-(aminoethyl)-gamma aminopropyl trimethoxysilane

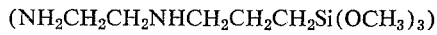

Pigments that may be advantageously modified and produced in accordance with the practice of the instant invention are finely divided particulate inorganic pigments such as, for example, inorganic compounds of silicon, including hydrated or anhydrous silicas and silicates, calcium silicates, magnesium silicates, calcium-magnesium silicates, barium silicates, aluminum silicates, sodium-alumino - silicates, calcium-alumino-silicates, calcium-sodium alumino silicates; clays such as kaolin or china clays including dickite, kaolinite, nacrite, and halloysite whether crude, air separated, water washed, delaminated, air dried, spray dried, calcined, slip, pulp, slurry or water suspension, montmorillonites and bentonites including sodium and magnesium bentonites, ball clays, fire clay and stoneware clays including diaspore, burley and burley-flint clays, fuller's earth, attapulgite and illite; synthetic or natural zeolites; diatomaceous earth, kieselguhr and diatomite, various metal oxides such as hydrated or anhydrous alumina, titania or magnesia; and the like.

All the above fillers are available on a commercial scale and include the following, all of which are finely divided particulate substances.

Zeolex®, very finely divided precipitated hydrated sodium alumino silicate pigments of submicron particle size and disclosed in U.S. Pats. 2,739,073 and 2,848,346.

Zeosil®, very finely divided precipitated hydrated silicas of submicron particle size and disclosed in U.S. Pats. 3,328,124 and 3,328,125.

Suprex®, an air floated kaolin clay with plate-like particles of which 87–92% are minus 2 microns.

Hydrogloss®, a water fractionated Georgia kaolin having a surface to mass ratio on the order of about 20–24 m.²/gm.

Zeofree®, a hydrated silicon dioxide.

Arogen®, an alkali metal alumino silicate or silica pigment disclosed in U.S. Pat. 3,582,379.

Zeothix®, a silica pigment.

Silene EF®, a precipitated hydrated calcium silicate of very fine particle size.

HiSil®, a precipitated hydrated silica of very fine particle size.

Celite®, a diatomaceous earth which is principally a hydrated silica.

Hydral®, a hydrated aluminum oxide of small particle size.

Titanox®, a pigment grade commercial titanium dioxide.

Cab-O-Sil®, a very finely divided anhydrous silica.

Lubox®, a precipitated silica of very fine particle size.

Mistron Vapor, a fine pigment grade talc,

3MgO·4SiO₂·H₂O.

The following examples will serve to better illustrate the present invention but are not intended to limit it thereto.

EXAMPLE 1

3000 pounds of a finely divided high surface area kaolin clay ("Hydragloss") was dispersed in sufficient water, with constant agitation, to form a pigment slurry having a total solids content of 52%. In a separate vessel, 30 pounds of gamma aminopropyltriethoxysilane (A–1100) was dissolved in 80 gallons of water. The clay slurry and solution of the silane were next continuously charged, under pressure, to a "Moyno" pump. The clay slurry was introduced at a rate of 15 gallons/minute. In the screw type "Moyno" pump a thick, plastic type mass was formed which was continuously extruded through a 1″ die at the discharge end of the pump. The pressure developed within the enclosed pump (measured near the die) was in excess of 50 p.s.i.g. The compacted extrudate was next dried and the product was recovered. As will be disclosed in more detail hereinafter, the properties of the surface modified pigment produced in this example were found to be substantially the same as those of the product produced in accordance with the teachings of U.S. Pat. 3,290,165.

EXAMPLE 2

The procedure of Example 1 was repeated except that the clay was modified, in a series of tests, with 0.1%; 0.5%; 1.5%; 2.0%; and 5.0% by weight (based on the weight of the clay pigment) of the gamma aminopropyltriethoxysilane. The products produced in this example were found to have substantially the same properties as the 1% surface modified pigment of Example 1. The above, as well as further tests, clearly established that the pigments could be surface modified with as little as 0.1% by weight of the organosilane.

EXAMPLE 3

The general procedures of Examples 1 and 2 were repeated except that "Y–2967," "Y–5162," and "Z–6020" (as identified above) were used in place of the gamma aminopropyltriethoxysilane ("A–1100"). The products so produced had substantially the same properties as those of Examples 1 and 2. Further tests, employing other commercially available amino organosilanes, produced substantially the same results.

EXAMPLE 4

The procedure of Examples 1 and 2 were repeated except that various pigments, as described and named herein, including "Suprex;" "Zeolex 7A;" "Zeolex 23;" "Zeosil;" "Hi-Sil 404;" "Zeofree 80;" "Arogen 500;" "Zeothix 80;" "Silene EF;" "Celite;" "Hydral 704;" "Hydral 705;" "Hydral 710;" "Titanox;" "Cab-O-Sil;" "Lubox;" "Mistron Vapor Talc;" were substituted for the "Hydragloss" pigment. The surface modified products produced in this example had properties similar to the products of Examples 1 and 2 and corresponding products disclosed in U.S. Pat. 3,290,165.

EXAMPLE 5

The general procedure of the above examples were repeated except that solids content of the pigment slurries were varied within the range of from 10 to 70% by weight total solids or otherwise to a high solids slurry. The results were the same as in the prior example.

EXAMPLE 6

The procedure of Example 1 was repeated except that a single barrel mixture-extruder, as disclosed in U.S. Pat. 3,380,116 was used in lieu of the "Moyno" pump. The results were substantially the same as that of Example 1. In the practice of the invention, as discussed above, it has been found that any suitable extrusion or solids mixing apparatus, such as kneaders, pugmills and the like may be employed.

In accordance with the invention and as similarly disclosed in U.S. Pat. 3,290,165, it has been found that the physical properties of the pigments are significantly altered by modification with the group of silanes disclosed herein. For example, when kaolin clay is so modified, a dramatic change in its properties is apparent. Where, before, the clay lacked significant affinity for direct dyes, it is modified by the process of this invention to be readily dyeable with direct dyes. The modified kaolin clays can be used as a filler for polyurethanes where before modification, it was unusable since it prevented a cure of the polymer.

In this regard the test procedures disclosed at column 4, lines 38–75 through column 8, line 6 of U.S. Pat. 3,290,165 were repeated employing products produced by the process of the invention with the results thereof being substantially the same as shown in Tables I–V of the patent. The tests clearly established dramatic improvements, for example, in the properties of polyurethanes filled with amino organosilane modified clays; and improved properties of surface modified "Zeolex®" pigments with respect to modulus, tensile strength, tear resistance and abrasive resistance as compared to these properties in rubber filled with unmodified Zeolex. For convenience and to avoid repetition, the test results, such as disclosed in Tables I–V of U.S. Pat. 3,290,165 have not been repeated herein. However the aforementioned data and Tables are considered to be incorporated herein by reference.

Other silanes than those specified above may be employed in accord with the present invention as, for example, the mercaptosilanes of U.S. Pat. 3,567,680 and various other silanes.

In some instances the silane employed may leave the system in some degree of a dispersed state where the silane does not act as a natural flocculating agent for the particular pigment system. In such cases one may employ sulfuric acid, other acids, alum or other salts such as sodium chloride as well as any number of other well-known flocculating agents to flocculate the system to the desired extent for carrying out the teachings of the present invention.

Although specific preferred embodiments of the present invention have been described in the detailed description above, the description is not intended to limit the invention to the particular forms or embodiments disclosed herein. They are to be recognized as illustrative rather than restrictive. It will be obvious to those skilled in the art that the invention is not so limited. The invention is declared to cover all changes and modifications of the specific examples of the invention herein disclosed for purposes of illustration, which do not constitute departures from the spirit and scope of the invention.

What is claimed is:

1. A process of producing surface modified inorganic pigments, said process comprising the steps of:
   (a) forming a high solids content aqueous dispersion of finely divided inorganic pigments and an aqueous solution of an amino organosilane; said organosilane having the formula

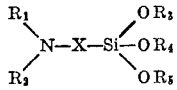

wherein $R_1$ is selected from the group consisting of hydrogen, alkyl aryl, cycloalkyl, alkylaryl, alkenyl, cycloalkenyl, alkene, alkylene, arylene, alkylarylene, arylalkylene, or cycloalkylene; $R_2$ is selected from the group consisting of hydrogen, alkyl, aryl, cycloalkyl, alkylaryl, alkenyl, cycloalkenyl, alkene, alkylene, arylene, alkylarylene, arylalkylene, or cycloalkylene; $R_3$ is selected from the group consisting of hydrogen, lower alkyl, aryl, lower alkylaryl, lower arylalkyl, alkenyl, cycloalkenyl, alkene, alkylene, arylene, alkylarylene, arylalkylene, or cycloalkylene; $R_4$ is selected from the group consisting of hydrogen, lower alkyl, aryl, lower alkylaryl, lower arylalkyl, alkenyl, cycloalkenyl, alkene, alkylene, arylene, alkylarylene, arylalkylene, or cycloalkylene; $R_5$ is selected from the group consisting of hydrogen, lower alkyl, aryl, lower alkylaryl, lower arylalkyl, alkenyl, cycloalkenyl, alkene, alkylene, arylene, alkylarylene, arylalkylene, or cycloalkylene; X is selected from the group consisting of alkyl, aryl, alkylaryl, arylalkyl, cycloalkyl, alkenyl, cycloalkenyl, alkene, alkenylene, cycloalkenylene, alkylene, arylene, alkylarylene, arylalkylene, cycloalkylene with or without secondary amino nitrogen or tertiary amino nitrogen pendant from the chain or other functional groups;
   (b) introducing said aqueous dispersion of the finely divided pigments and said solution of the amino organosilane into a mixing zone to form a thick, flowable plastic-type mass and to effect a reaction between the surface reactive group of said pigments with the functional groups of said organosilane; and
   (c) withdrawing the surface modified pigments from said mixing zone in the form of a compacted solidified mass.

2. The process in accordance with Claim 1 wherein said inorganic pigment is selected from the group consisting of synthetic silicas, silicates, and metal oxides.

3. The process in accordance with Claim 1 wherein said inorganic pigment comprises a finely divided particulate hydrated silica.

4. The process in accordance with Claim 1 wherein said inorganic pigment comprises a finely divided particulate sodium alumino silicate pigment.

5. The process in accordance with Claim 1 wherein said inorganic pigment comprises a finely divided particulate kaolin clay.

6. The process in accordance with Claim 5 wherein said kaolin clay is surface modified with from about 0.1% to 5% by weight, based upon the weight of the pigment, of an amino organosilane selected from the group consisting of gamma aminopropyltriethoxysilane, a diamino functional silane, a triamino silane, and N-beta-(aminoethyl)-gamma amino propyl trimethoxysilane.

7. The process in accordance with Claim 1 wherein the solids content of said aqueous dispersion of the inorganic pigments is in the range of from about 50 to 70% by weight and said amino organosilane is introduced into said pressurized mixing zone in an amount in the range of from about 0.1% to 5% by weight, based on the weight of said inorganic pigment, said amino organosilane being selected from the group consisting of gamma aminopropyltriethoxysilane and a diamino functional silane.

References Cited

UNITED STATES PATENTS 3,298,849   1/1967   Dohman et al. _____ 106—288
3,290,165   12/1966  Iannicelli _____ 106—308 N DELBERT E. GANTZ, Primary Examiner J. V. HOWARD, Assistant Examiner U.S. Cl. X.R.

106—72, 309

UNITED STATES PATENT OFFICE
CERTIFICATE OF CORRECTION

Patent No. 3,834,924          Dated September 10, 1974

Inventor(s)          THOMAS A. GRILLO

It is certified that error appears in the above-identified patent and that said Letters Patent are hereby corrected as shown below:

Column 4, line 28, "3,077,957" should be -- 3,007,957 --.

Column 5, line 1, "Hydrogloss®" should be -- Hydragloss® --.

Claim 1, first line, "of" should be -- for --.

Claim 1, line 14, instead of "hydrogen, alkyl aryl," it should be -- hydrogen, alkyl, aryl, --.

Signed and sealed this 14th day of January 1975.

(SEAL)
Attest:

McCOY M. GIBSON JR.
Attesting Officer

C. MARSHALL DANN
Commissioner of Patents